(12) United States Patent
Nguyen

(10) Patent No.: US 6,215,635 B1
(45) Date of Patent: Apr. 10, 2001

(54) DIRECT-TO-DIGITAL TEMPERATURE SENSOR

(75) Inventor: James Cong Nguyen, Portland, OR (US)

(73) Assignee: Dallas Semiconductor Corporation, Dallas, TX (US)

( * ) Notice: Subject to any disclaimer, the term of this patent is extended or adjusted under 35 U.S.C. 154(b) by 0 days.

(21) Appl. No.: 09/161,160

(22) Filed: Sep. 25, 1998

Related U.S. Application Data

(60) Provisional application No. 60/098,763, filed on Sep. 1, 1998.

(51) Int. Cl.[7] ................................................... H02H 5/00
(52) U.S. Cl. ............................ 361/103; 361/106; 361/115
(58) Field of Search ................................. 361/115, 103, 361/106

(56) References Cited

U.S. PATENT DOCUMENTS

| | | | |
|---|---|---|---|
| 3,855,466 | * | 12/1974 | Schwarz ................. 250/212 |
| 3,999,061 | * | 12/1976 | McLaughlin et al. ......... 250/214 R |
| 4,814,692 | * | 3/1989 | Baumann ................ 324/62 |
| 5,627,316 | * | 5/1997 | De Winter et al. ............ 361/280 |

* cited by examiner

*Primary Examiner*—Stephen W. Jackson
(74) *Attorney, Agent, or Firm*—Jenkens & Gilchrist

(57) ABSTRACT

A direct-to-digital temperature sensor is formed with a single switched-capacitor integrator, having a digital sequencer control.

16 Claims, 3 Drawing Sheets

DIRECT-TO-DIGITAL TEMPERATURE SENSOR

PRIORITY CLAIM

This patent application has a priority date of Sep. 1, 1998 based upon a provisional patent application, No. 60/098763, filed on that date.

FIELD OF THE INVENTION

The present invention relates generally to electronic devices. More particularly, the present invention relates to thermal management by integrated circuits.

BACKGROUND OF THE INVENTION

Various processes require temperature monitoring for effective control. Such processes obviously include manufacturing processes, but can also include transportation, security, maintenance, and other types of processes during which monitoring the thermal characteristics of devices is necessary or advisable. Today, increasingly, manufacturing processes are automatically controlled; such processes generally require electronic temperature measurement. Further, microcontrollers and processors—common control means in automatic processes—require digital, as opposed to analog, temperature measurements.

Heretofore, the assignee of the present invention has developed thermal management products—primarily temperature sensors—that provide a direct-to-digital output. Because the sensors made by the assignee of the present invention provide a digital reading of temperature directly, any need for an A/D converter dedicated to temperature measurement is eliminated. Assignee's sensors also do not require inherently analog or external discrete components, such as thermistors, for proper operation. Because of the aforementioned characteristics, assignee's sensors can easily be incorporated into integrated circuits.

Notwithstanding the work mentioned above, direct-to-digital temperature sensors still have a number of shortcomings. First and foremost, the costs of manufacturing are high, primarily because the devices must be calibrated—generally trimmed—multiple times. Trimming, in turn, is essential to obtain even reasonable accuracy. Offset voltages and mismatched currents prevent even reasonable accuracy if not addressed by trimming. In many cases, trimming is extremely expensive because a bath is required, which necessitates prepackaging with non-volatile memory.

In view of all of the foregoing, there is a clear need for a direct-to-digital temperature sensor that has reduced manufacturing costs, but high accuracy.

SUMMARY OF THE INVENTION

The present invention meets the aforementioned need by providing a direct-to-digital temperature sensor made up of a single switched-capacitor integrator, with a digital sequencer used to control all required operations.

One advantage of the present invention is the fact that no precise matching is required of any component pairs, because all operations are reduced to a series of samples using the same capacitor.

Another advantage of the present invention is the degree to which accuracy can be easily obtained. This follows from the fact that the only error source in embodiments of the present invention is the offset voltage of the integrator. Since there is just one offset, sophisticated methods can be used to reduce it.

Accordingly, an object of the present invention is to provide an extremely accurate direct-to-digital temperature sensor.

Another object of the present invention is to provide a temperature sensor that can be relatively inexpensively made.

BRIEF DESCRIPTION OF THE DRAWINGS

The foregoing, as well as other features, advantages, and objects of the present invention can be fully understood by reference to the following detailed description of the invention, taken in conjunction with the accompanying drawings wherein.

DETAILED DESCRIPTION

Figure 1:
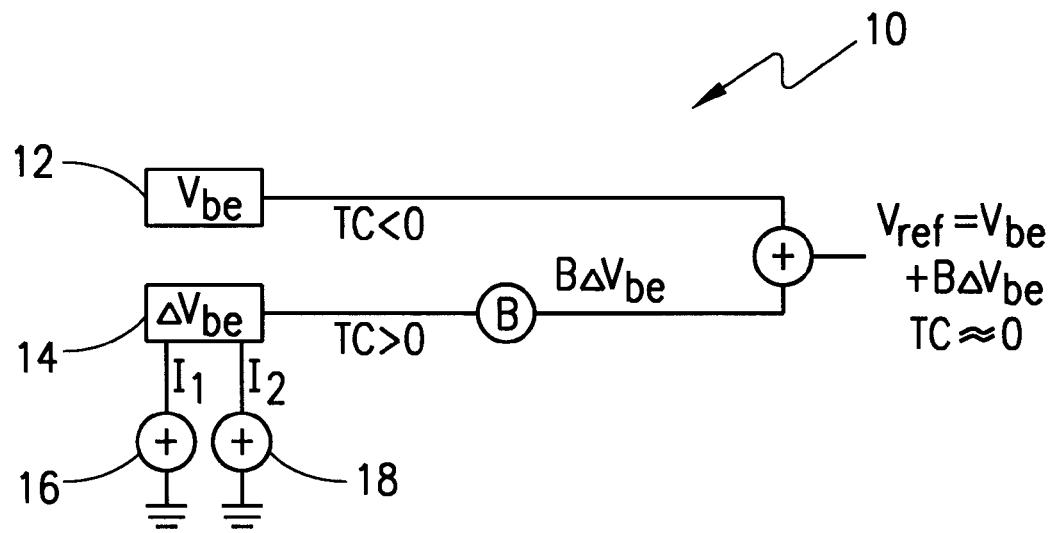
FIG. 1 is a schematic diagram of a Vref generator.

Referring now to the drawings and, in particular, to FIG. 1, there is shown a schematic diagram of a conventional Vref generator 10. Vref generator comprises a Vbe generator 12 and a ΔVbe generator 14. Vbe is generated to have a negative temperature coefficient, i.e., TC<0. ΔVbe, created in part by matched current sources 16, 18, is proportional to absolute temperature and, therefore, can be used to represent temperature. Furthermore, as shown in FIG. 1, ΔVbe has a positive temperature coefficient, i.e., TC>0. Generator 10 produces a Vref obtained from Vbe+B*ΔVbe, with B chosen so that Vref has a zero temperature coefficient.

Conventional temperature sensors must also generate voltages Vin. Vin, representing temperature, can also conventionally be obtained from A*ΔVbe.

Figure 2:
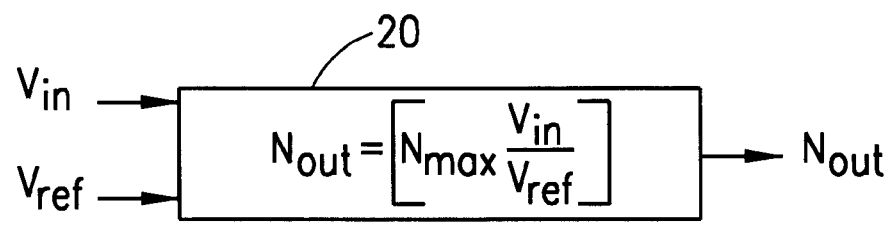
FIG. 2 is a block diagram illustrating operation of an analog-to-digital converter that can be used to generate digital temperature output in this technological area.

Referring now to FIG. 2, there is shown a conventional analog-to-digital converter (AD/converter) 20. Converter 20 accepts inputs Vin and Vref, generated as discussed above, and produces an output Nout by Quantizing Nmax*Vin/Vref. Based upon the value of Vin/ref, a value Nout is produced, varying from 0 to Nmax, as follows:

| Vin/Vref | Nout |
| --- | --- |
| 0 | 0 |
| 0.1 | 0.1 Nmax |
| 0.2 | 0.2 Nmax |
| . | . |
| . | . |
| . | . |
| 1 | Nmax |

As is known to those skilled in the art, in many AD/converter methods a critical operation is (Vx+/−Vref). Vx can be an intermediate internal voltage or, in the case of a Delta-Sigma Converter, it can be Vin itself.

To perform the functions mentioned above, several analog operations are needed; most notably, two multiplications [(A*ΔVbe) and (B*ΔVbe)], to obtain Vin and an intermediate value to be summed with Vbe to obtain Vref, respectively; and two additions/subtractions [(Vbe+B*ΔVbe) and (Vx+/−Vref)], to obtain Vref and the intermediate internal voltage discussed above, respectively.

Figure 3:
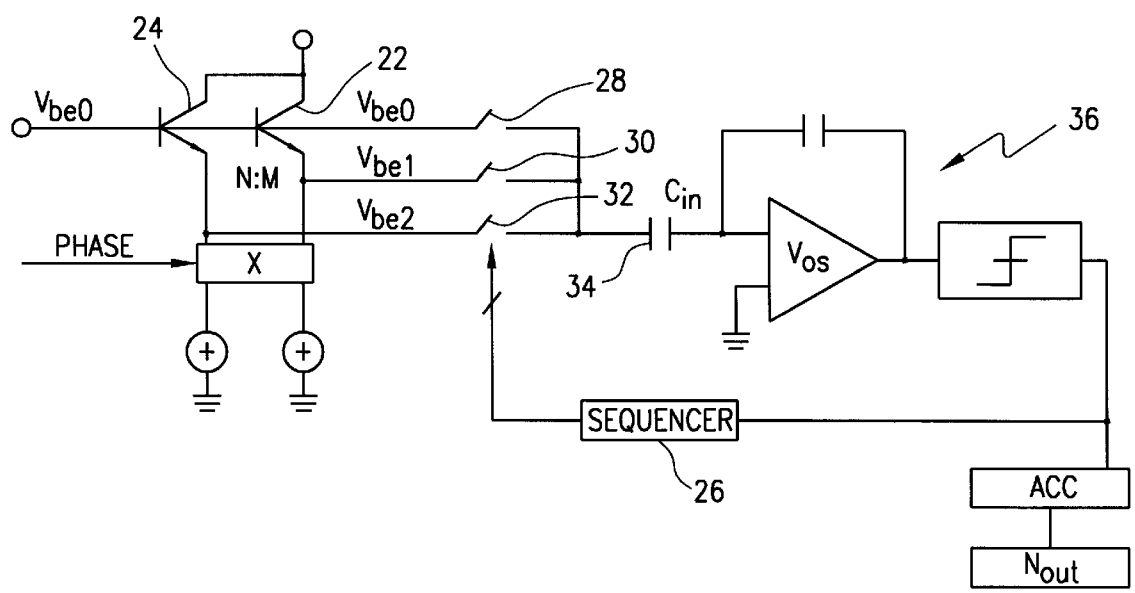
FIG. 3 is a schematic diagram of a temperature sensor according to the teachings of the present invention.

Most implementations of these analog operations suffer from amplifier input offset voltage and/or offset current, and limited matching capacity of electrical components such as resistors, capacitors, transistors, and the like. Typically, multiple amplifiers and multiple matched pairs are used in implementing the entire system. Each amplifier contributes its own offset and each matched pair contributes its matching error. Since each error has its own characteristics with respect to operating temperature and voltage, mechanical stress, and shift in time, the total error cannot be easily trimmed out using one or more calibrations. Referring now to FIG. 3, there is shown a temperature sensor according to the teachings of the present invention. This sensor effectively reduces all of the aforementioned analog operations into a single switched-capacitor integrator using a digital sequencer to control all required operations.

There are only three inputs to the entire system: Vbe0, Vbe1, and Vbe2. These inputs, as shown in FIG. 3, can be directly output (in the case of Vbe 0), output from a first transistor 22 (in the case of Vbe1), or output from a second transistor 24 (in the case of Vbe2). +ΔVbe can be generated by Vbe1−Vbe2. −ΔVbe can be generated by Vbe2−Vbe1. Similarly, −Vbe can be generated by Vbe2−Vbe0 and +Vbe can be generated by Vbe0−Vbe2. Thus, by effective control of transistors 22 and 24, the two main values used to generate Vref, discussed above with respect to FIG. 1, can be generated.

The aforementioned subtractions can be performed by sequencer 26, closing switches 28, 30, 32 appropriately. As is well known to those skilled in the art, in switched-capacitor circuits, an addition or subtraction differs only in the switching sequence which is handled by the digital sequencer 26. In FIG. 3, capacitor C in 34 is the switched capacitor on which the voltages Vbe and ΔVbe can be captured.

Since Vin can be written as (A*ΔVbe) and −Vref is −(Vbe+B*ΔVbe), a complex operation such as (Vin−Vref) can be performed as follows.

1) +(ΔVbe) is sampled A times;
2) −(ΔVbe) is sampled B times; and
3) −(Vbe) is sampled one time.

Such successive sampling can be readily accomplished by control of sequencer 26, in a manner well known to those skilled in the art.

The above described technique offers a number of advantages. First of all, because all operations are reduced to a series of samples using the same capacitor C in 34, no precise matching is required of any component pairs. Secondly, the only error source is the offset voltage of the integrator 36. Since there is just one offset, sophisticated methods can be used to reduce it. For example, one such method is Correlated-Doubled Sampling (CDS), a holding method in which a separate capacitor is used to sample the offset. Another possible dynamic offset cancellation technique is a digital one that is unique to one-shot type of conversions such as temperature measurement. Since the entire measurement is completed before another one is started, the effect of offset, Vos, can be reversed halfway through the conversion. In equation form:

$Nout=½*(N1−N2)$ $N1=Nmax*(Vin+Vos)/Nref$ $N2=Nmax*(-Vin+Vos)/Vref$ $Nout=½[(Nmax*(Vin+Vos)/Vref]−[Nmax*(-Vin+Vos)/Vref)]$ Note: $(Nmax*(Vin+Vos)/Vref)=N1$, and $(Nmax*(-Vin+Vos)/Vref)=N2$ $Nout=½*Nmax*(2*Vin+Vos−Vos)/Vref$ $Nout=Nmax*Vin/Vref$ Such reversal effectively "cancels out" the offset error. As mentioned previously, Vin or −Vin is obtained by simply changing the sampling sequence.

In generation of ΔVbe in embodiments of the present invention, two identical copies of a biasing current are used to bias two bipolar transistors (shown) or diodes (not shown) with different effective areas. Mismatch between currents can readily be eliminated. There are two phases in each cycle: a sampling phase and an integration phase. The two currents are swapped between the two phases in the circuit that generates Vbe1 and Vbe2. The effective biasing current at the end of each cycle is the mean of the two currents.

Based upon the foregoing, those skilled in the art should now recognize and appreciate that the present invention provides a temperature sensor that reduces all basic analog operations into a single switched capacitor integrator, using a digital sequencer to control all required operations. Thus, the present invention provides a temperature sensor that is relatively inexpensive to manufacture, but also very accurate. With regard to the latter aspect, the only error source in the invention—offset error of the integrator—is easily subject to reduction methods.

Figure 4:
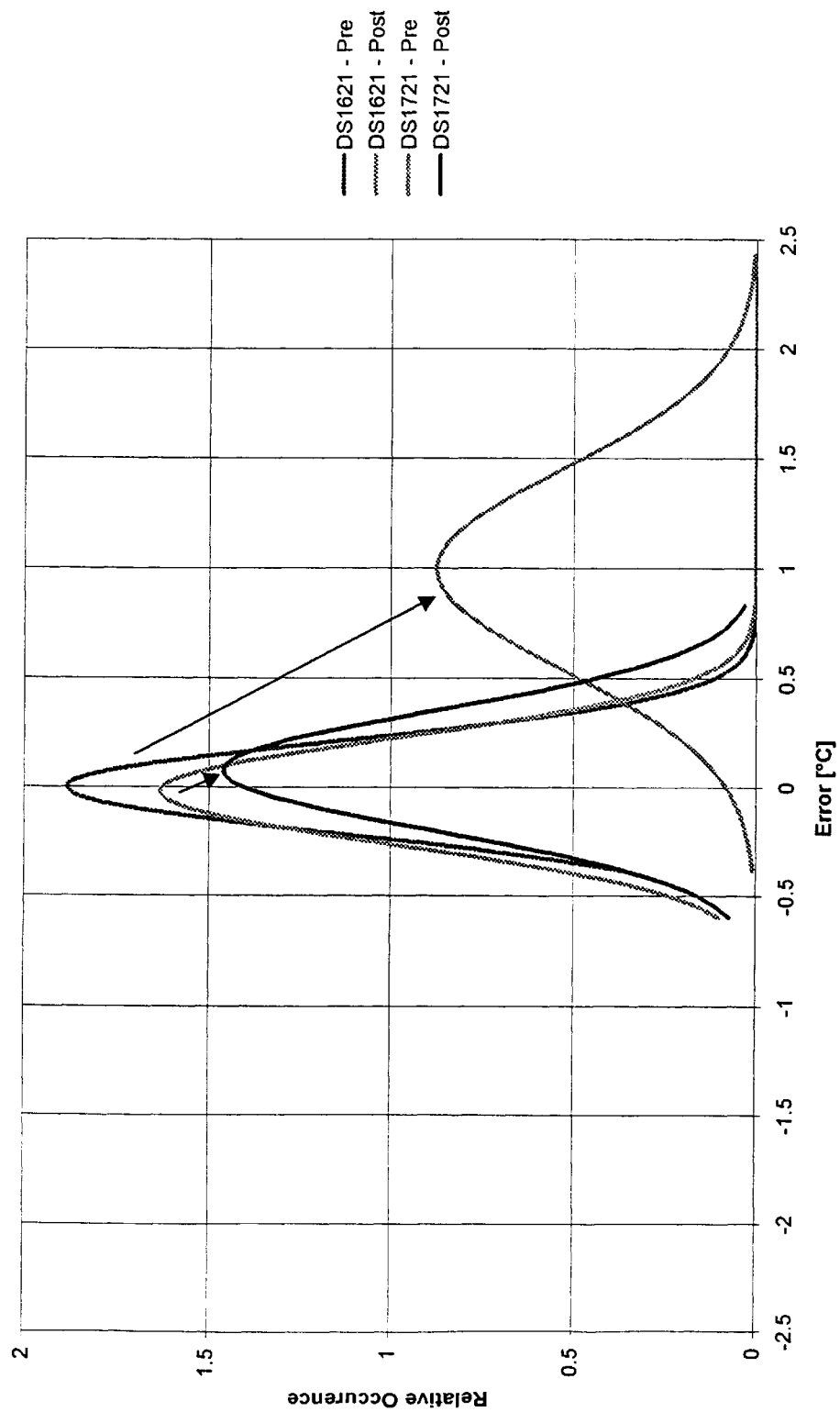
FIG. 4 is a graph showing relative accuracies of products made according to the teachings of the present invention compared to products made according to prior art principles.

Referring now to FIG. 4, there is a graph that should give those skilled in the art an appreciation of the relatively small accuracy drift of a product made according to the teachings of the present invention (the DS 1721), compared to a prior art direct-to-digital temperature sensor (the DS1621). From FIG. 4, it should be clear how much more accurate products made according to the teachings of the present invention are compared to products made according to prior art principles. This increased accuracy is particularly astounding recognizing that products made according to the teachings of the present invention require much less trimming, and thus are much cheaper to make, than products made according to prior art principles.

Attached as Appendix A is a preliminary data sheet providing details about an embodiment of the present invention subject to development efforts by the assignee of the present invention. Appendix A is attached as an example only, of a possible embodiment of the present invention.

Obviously, numerous modifications and variations are possible in view of the teachings above. Accordingly, within the scope of the appended claims, the present invention may be practiced otherwise than as is specifically described above.

What is claimed is:

1. A temperature sensor comprising:
    a switched-capacitor integrator;
    a digital sequencer control wherein said digital sequencer controller sequences voltage to the input of said switched capacitor integrator and further wherein said capacitors have fixed values.

2. The temperature sensor of claim 1, further comprising means for canceling integrator offset voltage.

3. The temperature sensor of claim 2, wherein said means for canceling comprises a separate capacitor used to sample integrator offset.

4. The temperature sensor of claim 3, wherein said separate capacitor allows implementation of correlated-doubled sampling.

5. The temperature sensor of claim 2, wherein said means for canceling comprises means for reversing integrator offset halfway through conversions.

6. The temperature sensor of claim 1, further comprising means for eliminating mismatch between two different biasing currents.

7. The temperature sensor of claim 6, wherein said means for eliminating comprises means for swapping sampling and integration phases in Vbe1 and Vbe2 generation circuits.

8. The temperature sensor of claim 6, wherein said biasing currents are used to bias two bipolar transistors with different effective areas.

9. The temperature sensor of claim 6, wherein said biasing currents are used to bias diodes with different effective areas.

10. The temperature sensor of claim 1, wherein there are only three inputs to the system.

11. A system employing thermal management components comprising:
    a switched-capacitor integrator; and
    a digital sequencer control for said switched capacitor integrator wherein said digital sequencer controller sequences voltages to the input of said switched capacitor integrator and further wherein said capacitors have fixed values.

12. The system of claim 11, further comprising means for canceling offset errors in said thermal management components.

13. The system of claim 11, further comprising means for eliminating current mismatches in said thermal management components.

14. A method of detecting temperature comprising the steps of:
    sampling voltages using a switched-capacitor integration; and
    controlling sampling with a digital sequencer whereby said digital sequencer sequences voltages to the input of the switched-capacitor integrator and wherein the capacitance values at the input to the switched-capacitor integrator are fixed.

15. The method of claim 14, further comprising the steps of canceling integrator offset error.

16. The method of claim 14, further comprising the step of eliminating biasing current mismatches.

* * * * *